United States Patent
Azgin et al.

(10) Patent No.: US 10,182,091 B2
(45) Date of Patent: Jan. 15, 2019

(54) DECENTRALIZED, HIERARCHICAL, AND OVERLAY-DRIVEN MOBILITY SUPPORT ARCHITECTURE FOR INFORMATION-CENTRIC NETWORKS

(71) Applicant: Futurewei Technologies, Inc., Plano, TX (US)

(72) Inventors: Aytac Azgin, Santa Clara, CA (US); Ravishankar Ravindran, San Ramon, CA (US); Guoqiang Wang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 183 days.

(21) Appl. No.: 15/159,033

(22) Filed: May 19, 2016

(65) Prior Publication Data

US 2017/0339228 A1 Nov. 23, 2017

(51) Int. Cl.
*G06F 15/16* (2006.01)
*H04L 29/06* (2006.01)
*H04L 29/08* (2006.01)
*G06F 9/46* (2006.01)
*H04W 8/00* (2009.01)

(52) U.S. Cl.
CPC ............ *H04L 65/4084* (2013.01); *G06F 9/46* (2013.01); *H04L 65/1073* (2013.01); *H04L 67/32* (2013.01); *H04W 8/00* (2013.01); *H04L 67/327* (2013.01)

(58) Field of Classification Search
CPC .................. H04L 65/4084; H04L 65/1073
USPC ......................................................... 709/217
See application file for complete search history.

(56) References Cited

U.S. PATENT DOCUMENTS

| | | | | |
|---|---|---|---|---|
| 2009/0093249 A1* | 4/2009 | Zhu | ................ | H04W 8/06 455/433 |
| 2011/0125888 A1* | 5/2011 | Yi | ................ | H04L 67/16 709/223 |
| 2011/0208961 A1* | 8/2011 | Bushman | ............... | G06Q 20/02 713/156 |
| 2011/0213896 A1* | 9/2011 | Merino Vazquez | ........ | H04L 29/12188 709/245 |
| 2011/0275372 A1* | 11/2011 | Shi | ..................... | H04L 65/1016 455/435.1 |

(Continued)

OTHER PUBLICATIONS

Ain, Mark, et al., "PSIRP Publish-Subscribe Internet Routing Paradigm", FP7-INFSO-IST-216173, (Aug. 8, 2008), 1-85.

(Continued)

*Primary Examiner* — Karen C Tang
(74) *Attorney, Agent, or Firm* — Schwegman Lundberg & Woessner, P.A.

(57) ABSTRACT

An anchor server in an information-centric network (ICN) receives registration and deregistration requests from one or more producers in the ICN. In response to a producer initially registering, the anchor server stores records associating the producer with content available from the producer via a first point of attachment. In response to the producer deregistering, the records are marked as deactivated. While the records are deactivated, requests for the content from consumers may be queued. In response to the producer reregistering as being connected to the ICN via a second point of attachment, the queued requests are forwarded to the producer via the second point of attachment.

14 Claims, 12 Drawing Sheets

(56) References Cited

U.S. PATENT DOCUMENTS

| | | | | |
|---|---|---|---|---|
| 2013/0258947 | A1* | 10/2013 | Gomez Diaz | H04W 8/005 370/328 |
| 2015/0296028 | A1 | 10/2015 | Scott et al. | |
| 2015/0312387 | A1* | 10/2015 | Merino Vazquez | H04L 65/1016 370/216 |
| 2016/0119194 | A1* | 4/2016 | Valencia Lopez | H04L 41/50 709/223 |
| 2016/0150497 | A1* | 5/2016 | Janosi | H04L 65/1016 455/435.1 |

OTHER PUBLICATIONS

Ghodsi, Ali, et al., "Information-Centric Networking: Seeing the Forest for the Trees", Proceedings of the 10th ACM Workshop on Hot Topics in Networks, Article No. 1, (2011), 1-6.

Perino, Diego, et al., "A Reality Check for Content Centric Networking", ICN '11, Proceedings of the ACM SIGCOMM Workshop on Information-centric Networking, Aug. 19, 2011, Toronto, Ontario, Canada, (2011), 44-49.

Salsano, S., et al., "Information centric networking over SDN and OpenFlow: Architectural aspects and experiments on the OFELIA testbed", Computer Networks, 57(16), (Nov. 13, 2013), 28 pgs.

Solis, Nacho, et al., "CCN 1.x Tutorial", [online]. Retrieved from the Internet: http://www.ccnx.org/pubs/ACM%20ICN%202014%20CCN%20Tutorial.pdf>, (2014), 229 pgs.

Tyson, Gareth, et al., "A Survey of Mobility in Information-Centric Networks: Challenges and Research Directions", NoM '12, Proceedings of the 1st ACM Workshop on Emerging Name-Oriented Mobile Networking Design—Architecture, Algorithms, and Applications, Jun. 11, 2012, Hilton Head, SC, (2012), 6 pgs.

* cited by examiner

DECENTRALIZED, HIERARCHICAL, AND OVERLAY-DRIVEN MOBILITY SUPPORT ARCHITECTURE FOR INFORMATION-CENTRIC NETWORKS

TECHNICAL FIELD

Embodiments of the present disclosure relate generally to communication networks and, more particularly, but not by way of limitation, to methods and systems for communicating data in information-centric networks.

BACKGROUND

Conventionally, information-centric networks allow consumers to request content by an identifier of the desired information rather than an identifier of the host of the content. For example, a publish/subscribe paradigm may be used. In this paradigm, information providers publish information about the content they have available and consumers subscribe to desired content.

SUMMARY OF THE INVENTIVE SUBJECT MATTER

In some example embodiments, what is disclosed is a system comprising: a memory storing instructions; and one or more processors configured by the instructions to perform operations comprising: receiving, from a producer device in an information-centric network (ICN), a first registration request that includes a namespace of the producer device and identifies a first point of attachment that connects the producer device to the ICN; maintaining a set of records associating the producer device with content identifiers; receiving, from the producer device, a deregistration request; in response to the receipt of the deregistration request, modifying the set of records to indicate deregistration of the producer device; after receiving the deregistration request, receiving from a consumer device in the ICN a first set of data requests, each data request in the first set of data requests including a content identifier associated with the producer device by the set of records; in response to a determination, based on the set of records, that the producer device has been deregistered, queueing the first set of data requests; while the set of data requests are queued, receiving, from the producer device, a second registration request that identifies a second point of attachment different from the first point of attachment; in response to the receipt of the second registration request: updating the set of data records to indicate registration of the producer device; and sending the queued first set of data requests to the producer device via the second point of attachment.

In some example embodiments, what is disclosed is a method comprising: receiving, at a first server in an ICN, from a producer device in an ICN, a first registration request that includes a namespace of the producer device and identifies a first point of attachment that connects the producer device to the ICN; maintaining, at the first server, a set of records associating the producer device with content identifiers; receiving, from the producer device, a deregistration request; in response to the receipt of the deregistration request, modifying, by the first server, the set of records to indicate deregistration of the producer device; after receiving the deregistration request receiving, by the first server and from a consumer device in the ICN, a first set of data requests, each data request in the first set of data requests including a content identifier associated with the producer device by the set of records; in response to a determination, based on the set of records, that the producer device has been deregistered, queueing the first set of data requests; while the set of data requests are queued, receiving, by the first server and from the producer device, a second registration request that identifies a second point of attachment different from the first point of attachment; in response to the receipt of the second registration request: updating the set of data records to indicate registration of the producer device; and sending the queued first set of data requests to the producer device from the first server via the second point of attachment.

In some example embodiments, what is disclosed is a machine-readable medium not having any transitory signals and having instructions embodied thereon which, when executed by one or more processors of a machine, cause the machine to perform operations comprising: receiving, from a producer device in an (ICN, a first registration request that includes a namespace of the producer device and identifies a first point of attachment that connects the producer device to the ICN; maintaining a set of records associating the producer device with content identifiers; receiving, from the producer device, a deregistration request; in response to the receipt of the deregistration request, modifying the set of records to indicate deregistration of the producer device; after receiving the deregistration request receiving, from a consumer device in the ICN, a first set of data requests, each data request in the first set of data requests including a content identifier associated with the producer device by the set of records; in response to a determination, based on the set of records, that the producer device has been deregistered, queueing the first set of data requests; while the set of data requests are queued, receiving, from the producer device, a second registration request that identifies a second point of attachment different from the first point of attachment; in response to the receipt of the second registration request: updating the set of data records to indicate registration of the producer device; and sending the queued first set of data requests to the producer device via the second point of attachment.

BRIEF DESCRIPTION OF THE DRAWINGS

Various of the appended drawings merely illustrate example embodiments of the present disclosure and cannot be considered as limiting its scope.

Figure 1:
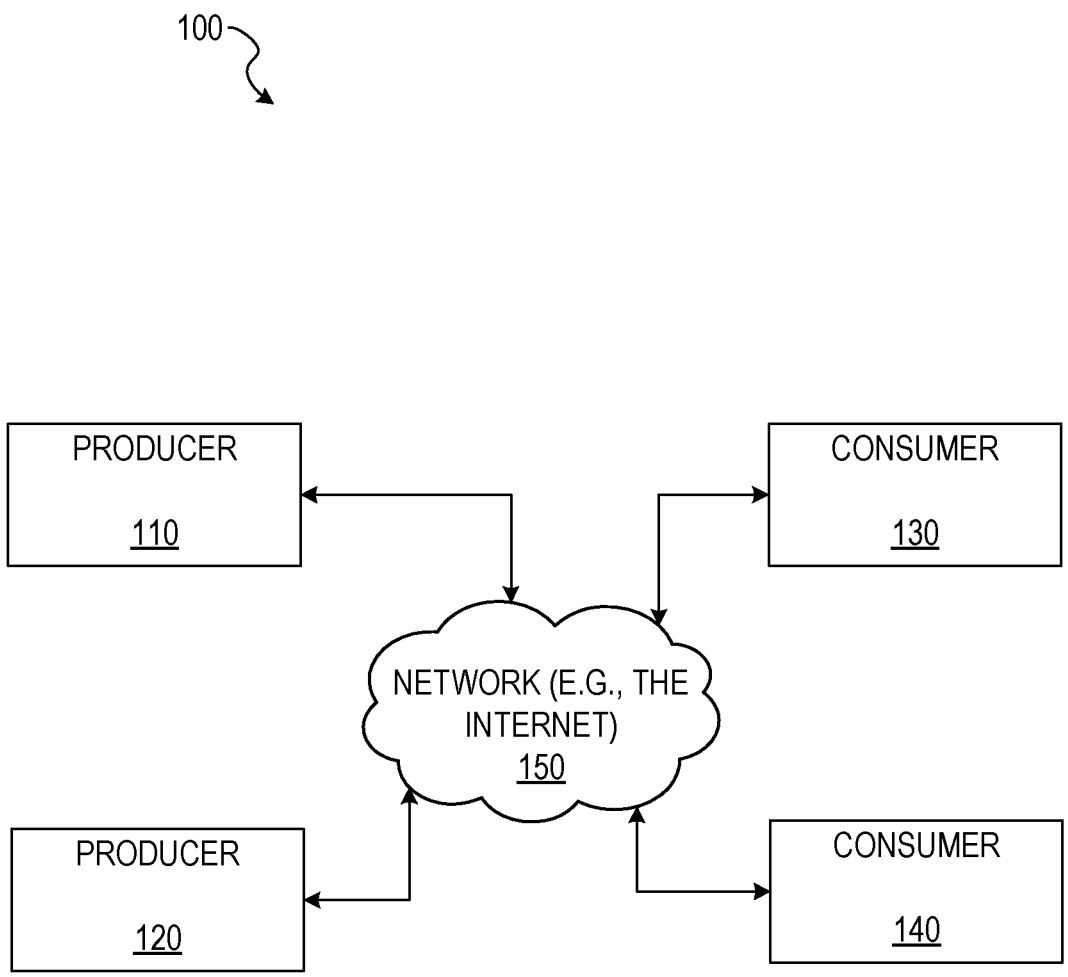
FIG. 1 is a block diagram illustrating a networked system suitable for information-centric networking, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A domain name system (DNS) server maps server names to Internet protocol (IP) addresses. Accordingly, whenever a machine on the Internet has the name of another machine to send data to, but does not have the corresponding IP address, the IP address can be retrieved by contacting a DNS server. No single DNS server can process every IP address lookup for the entire Internet. Accordingly, the DNS information is distributed between many servers. Ideally, the information on each server is the same. However, in practice, propagation of changes (e.g., from the addition or removal of a machine from the Internet) takes time, often up to several hours. Thus, DNS is not suitable for services that frequently change their IP addresses. Frequently-changing IP addresses occur in a number of situations, for example when devices using the dynamic host configuration protocol (DHCP) move between hosts. In view of the increasing mobility of computing devices such as tablets and smart phones, new architectures for networks may be needed, such as an information-centric network (ICN) implemented using one or more methodologies disclosed herein.

In current ICN-based architectures such as content centric networking (CCN) and named data networking (NDN), routers keep state information for each request to guide data packets between consumers and producers in the network (e.g., within a pending interest table). Maintenance of this state information for each request consumes significant resources, at least some of which may be saved according to one or more methodologies disclosed herein.

In the default case, there is only one active anchor for a given namespace within each domain. So, there should not be any conflict as to whom to send to. The case with multiple active anchors for a given namespace within a domain can be explained with a clustered architecture. However doing so may introduce additional complexities to the system. Information on anchors should be shared within a domain, which enables correctness in forwarding. Hence anytime a registration message is received, it is forwarded to the correct anchor responsible for that namespace. Anchors provide additional functionalities. For instance, on the Producer side, enabling registration with the global name anchor. Also additional states can be kept to support mobility-related features (seamless handover, or fast connection re-establishment with the mobile host). Typical content routers do not need to keep any state in regards to the mobile host or targeted requests/responses, and their forwarding decisions are essentially driven by the anchors. Since content routers between mobile host and anchor directly forward the packet to the anchor, no state needs to be kept (per packet) to help with the forwarding decision. In current ICN-based architectures (CCN/NDN), routers keep state information per-request to guide Data packets (within Pending Interest Table or PIT). Anchor gives the ability to bypass that requirement. Our architecture does not remove such components from the content routers. Instead, by matching namespace to anchors/non-anchor nodes, we enable/disable the use of such components on a per-request basis (depending on the namespace). De-registration process allows the Anchor to stop forwarding requests to the Producer, and instead queue such requests within mobile-PIT to forward to the Producer when it re-registers at its new location. After re-registration, it batch forwards the pending requests to the Producer. Since state is kept in regards to the Producer during handover, it is not a fresh registration. Ideally, any content router can operate as an anchor, since changes required to operate as an anchor is minimal and anchor functionalities can be re-assigned depending on system load to support better load balancing. Practically, it is desirable to avoid frequently reassigning anchors. So, such functionalities in practice can be limited to a subset of content routers, even though dynamically changing an anchor is allowed.

In an ICN, consumers of content request content by an identifier of the content, rather than an identifier of the host providing the content. This is in contrast to a host-centric network. For example, in a host-centric network, a particular file may be identified by the Internet protocol (IP) address of the host and a name of the file being requested from the host. In an ICN, the file may be identified by a namespace and the name of the file. A similar contrast exists on the producer side. In a host-centric network, the host passively waits for content requests. In an ICN, the producer publishes information to the network about the content available from the producer. For example, the content may be available at the time of publication or expected to be made available in the future. Accordingly, when a consumer of content requests particular content, the content may be served from any host of the content.

Both producers and consumers in an ICN may be mobile devices. For example, when two users are having a video call on their smart phones, each device is producing content for the other and consuming content from the other. During the call, one or both users may be in motion (e.g., walking, riding in a car, or riding in a train). Due to the motion, the physical path taken by the data may change. For example, the smart phone may leave the coverage area of one cell tower (or access point) and enter the coverage area of another cell tower (or access point). Accordingly, data sent to the smart phone must be sent to the new cell tower in order to reach the user. This is handled in a straightforward manner by having the smart phone register with the new cell tower and reissue any data requests that have not yet been responded to by the other device. When the other device receives those requests, the network will correctly route them to the new cell tower. A more difficult problem is in handling the pending requests that the relocated device needs to respond to. One solution is to allow the pending requests that were sent to the old cell tower to expire after an elapse of time, eventually resulting in a timeout at the consumer. The timeout may trigger a retransmission of the request. In some example embodiments, the timeout results in the dropping of the video call, which may be remedied by calling again. Seamless mobility is achieved when the migration of a device from one domain to another is accomplished without perceptible interruption to the user.

The ICN is composed of computers organized into domains Each domain has one or more content routers administered by a single administrative authority. In some example embodiments, each namespace has a single content router in each domain serving as an anchor for that namespace. That is, one anchor server may be an anchor for multiple namespaces, but each namespace, by default, has only one active anchor (actively handling matching requests) in the domain. In various example embodiments, each namespace corresponds to an application, a type of connection to the network, a domain, or any suitable combination thereof. In some example embodiments, one or more anchor servers for the namespace, across all the domains, are global anchor servers for the namespace. The other anchor servers are local anchors; that is, they only manage requests (such as registration/deregistration) received within their domain When a content router receives a data registration or a content request associated with a particular namespace, the received communication is forwarded to the local anchor server for the particular namespace. Thus, the content router does not need to analyze the communication to determine the particular content involved, thereby saving processing time. The local anchor server maintains state information for the namespace. Accordingly, if the local anchor is not able to directly process the communication (e.g., by responding with requested content), the anchor server forwards the request to an appropriate local anchor server on another domain, if known, or to a global anchor server for the namespace.

Through the use of the local anchor, mobility of a producer within a single domain is transparently provided to all consumers in the network. When the producer sends a de-registration request that indicates the namespace, the content routers in the domain forward the request, based on the namespace, to the local anchor. The local anchor receives and processes the de-registration request. In some example embodiments, the local anchor queues any content requests for content previously registered by the producer. When the producer re-connects (or re-establishes its connection) to the network, it sends a re-registration request that, again, indicates the namespace, allowing the content routers to forward the request to the local anchor. The local anchor processes the re-registration request. In some example embodiments, the re-registration request does not explicitly identify the content provided by the producer and the local anchor reinstates registration of the provider for the previously-registered content. The local anchor may forward any queued requests to the producer after the producer has re-registered.

Inter-domain mobility (that is, movement of the producer between domains) is handled by having the de-registration request from the producer include information on the domain being switched to. The local anchor for the old domain forwards the registration information for the producer to the local anchor for the new domain. The local anchor also informs a global anchor for the namespace, if global anchors are used. Any user requests received at the old/previous local anchor are forwarded to the new local anchor. The old/previous local anchor may queue any requests received before the producer sends a registration request to the new local anchor. Once the local anchor for the producer's new domain receives the registration request, the producer may be associated with its previously-registered content and any queued content requests may be sent to the producer. Thus, seamless mobility may be achieved because the queued requests reach the producer even though the producer has changed domains. As the content is sent across the network to the consumer, the intermediate anchors and content routers can take note of the origin of the content and update their forwarding states. Accordingly, later requests for the content will be sent to the producer's current domain rather than to the previous one.

With reference to FIG. 1 an example embodiment of a networked system 100 suitable for information-centric networking is shown. The networked system 100 includes a producer 110, a producer 120, a consumer 130, a consumer 140, and a network 150. The producers 110 and 120 provide data, services, or both to the consumers 130 and 140 via the network 150. The producers and consumers are collectively referred to as endpoint devices.

The endpoint devices 110-140 may include applications that are employed by a user. The endpoint devices 110-140 may comprise, but are not limited to, a mobile phone, desktop computer, laptop, portable digital assistant (PDA), smart phone, tablet, ultra book, netbook, multi-processor system, microprocessor-based or programmable consumer electronics, server, or any other communication device that a user may utilize to access the network 150. In some embodiments, each endpoint device 110-140 may comprise a display device (not shown) to display information (e.g., in the form of user interfaces). One or more portions of the network 150 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Figure 2:
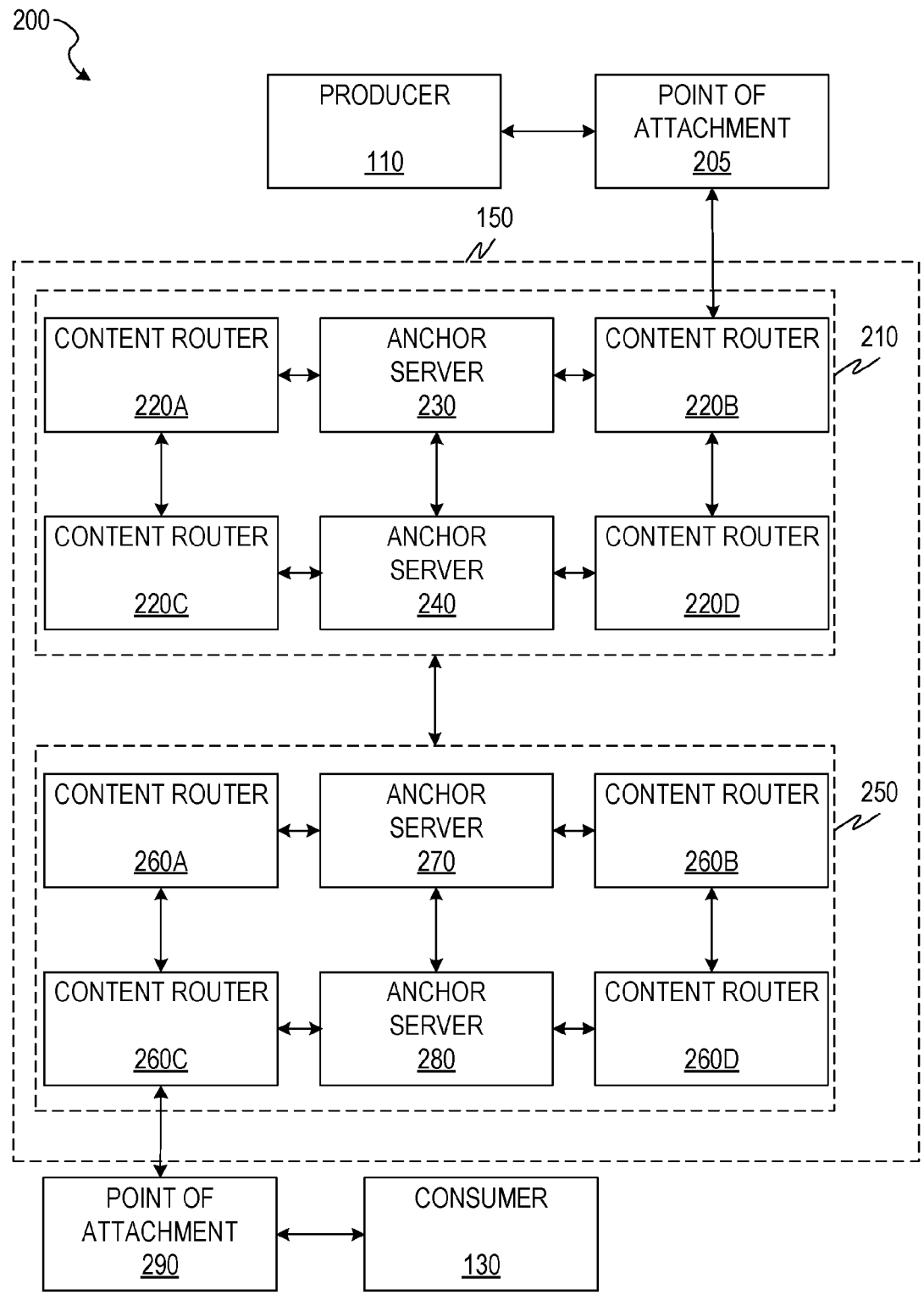
FIG. 2 is a block diagram illustrating a networked system suitable for information-centric networking, according to some example embodiments.

With reference to FIG. 2, an example embodiment of a high-level client-server-based network architecture 200 is shown. The network architecture 200 includes the producer 110, which is connected by a point of attachment 205 to the network 150. The network 150 is also connected by a point of attachment 290 to the consumer 130. Within the network 150 are domains 210 and 250. The domain 210 includes content routers 220A-220D, an anchor server 230, and an anchor server 240. The domain 250 includes content routers 260A-260D, an anchor server 270, and an anchor server 280. In some example embodiments, each of the anchor servers within a single domain are assigned to different namespaces, such that each namespace has a single anchor server within each domain Other domains, content routers, anchor servers, producers, consumers, and points of attachment (not shown) may be present in the network architecture 200.

Each content router 220A-220D and 260A-260D routes data requests and responses through the network 150. The anchor servers 230, 240, 270, and 280 each act as a content router, and, in some example embodiments, have a content store, pending interest table (PIT), and forwarding information base (FIB). Additionally, the anchor servers may have additional functionalities or data structures to support producer mobility, such as a mobile PIT, a mobile forwarding table, and a cluster management table.

The points of attachment 205 and 290 are the systems by which the producer 110 and the consumer 130 connect to the network 150. Example points of attachment include an 802.11 access point, a code-division multiple access (CDMA) base station, or an Ethernet router.

Figure 3:
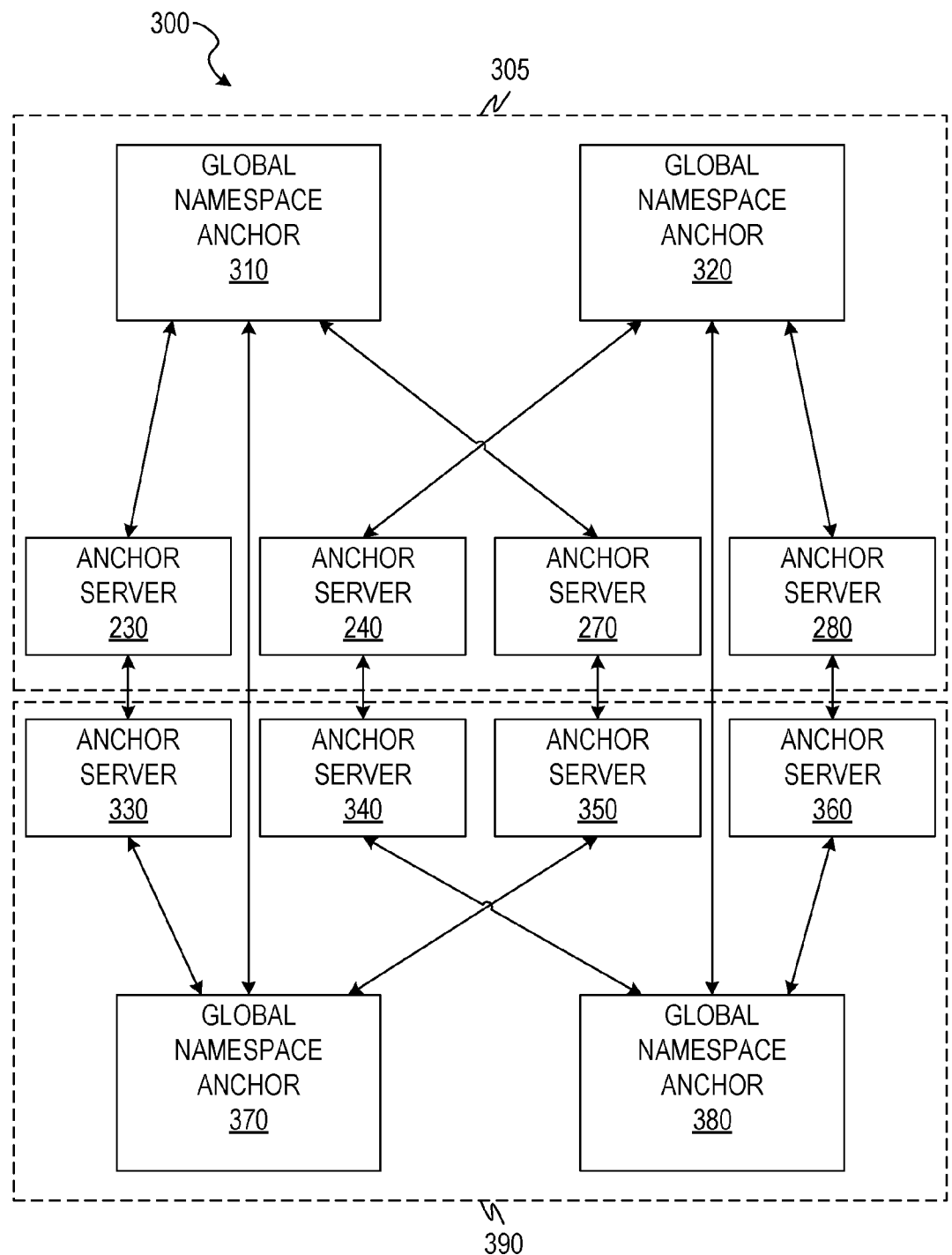
FIG. 3 is a block diagram illustrating a networked system suitable for information-centric networking, according to some example embodiments.

FIG. 3 is a block diagram illustrating a networked system 300 suitable for information-centric networking, according to some example embodiments. Shown in FIG. 3 are two clusters 305 and 390, containing the anchor servers 230, 240, 270, and 280 of FIG. 2, additional anchor servers 330-360, and global namespace anchors 310, 320, 370, and 380. Each global namespace anchor 310, 320, 370, 380 provides global namespace services for the namespaces it manages to anchor servers in its cluster of domains A cluster is an intermediate level of organization between the domain and the network. For simplicity, FIG. 3 shows only the local and global namespace anchors, not the other content routers in the domains.

In some example embodiments, each anchor server has a cluster management table (CMT). The cluster management table stores information regarding members of the cluster. Each member of the cluster is an anchor server for the namespace of the cluster. For example, if anchor servers 230 and 270 are anchors for the namespace "orange" and anchor servers 240 and 280 are anchors for the namespace "red," then the CMT on anchor servers 230 and 270 would identify the membership of those two servers in the "orange" cluster, and the CMT on anchor servers 240 and 280 would identify the membership of those two servers in the "red" cluster. The CMT enables each anchor server in the cluster to identify the other anchor servers in the cluster. Additionally, a flag in the CMT identifies which of the anchor servers in the cluster is the global namespace anchor (GNA). Each other namespace anchor is referred to as a local namespace anchor (LNA). The GNA is an LNA that acts as a cluster head for a set of domains. For example, in FIG. 3, the GNA 310 is the GNA for the "orange" namespace of LNAs 230 and 270 in the cluster 305, and the GNA 320 is the GNA for the "red" namespace of LNAs 240 and 280 in the same cluster. Each LNA is aware (through the CMT) of the GNA responsible for its discovery.

A consumer may discover a producer's location through a request to the GNA for the consumer's cluster and the producer's namespace. Whenever an LNA receives a registration request for a producer in its managed namespace, the LNA forwards the request to the GNA for the namespace in its cluster. The GNA stores an entry in its FIB or MFT indicating the LNA for the producer. The GNA also uses overlay broadcast to send the updated information to all GNAs for the namespace in the network. In this manner, any device in the network can identify the domain of any producer in the namespace by requesting the information from the GNA in its cluster. Note that in the case where the corresponding LNA within a consumer's domain already has an active session with the producer for another consumer, the GNA request may be avoided and the existing routing information can be used for both consumers.

Alternatively, a consumer may discover a producer's location through an LNA-level broadcast. This entails querying each LNA for the namespace of the producer to determine if the producer is registered with that LNA. Once the appropriate LNA (and, thus, the appropriate domain) is identified, the routing path for the producer can be determined. However, requesting the location from the GNA may reduce the initial messaging overhead for discovery compared to the LNA-level broadcast. In some example embodiments, GNAs are not used, making the LNA-level broadcast an attractive option.

Within the network, allocation of domains to clusters may be performed as follows. An m-ary tree is created at a server in the network (e.g., at the content router having the lowest identifier (e.g., Internet protocol (IP) address, if ICN is used as overlay) of servers in the domain having the lowest identifier), where m is the highest number of neighbors of any server in the network. The creating server initializes the tree by placing itself at the root and each of its neighbors as first-level children, sorted from left to right by increasing identifier values. The server also creates a mapping table to represent state of allocation to different namespaces (e.g., assignment count). Then, the tree, together with the mapping table, is passed to each neighbor domain in sequence. The neighbors add their neighbors to the tree as children of their corresponding nodes, unless the neighbor is already in the tree. Thus, if two neighbors of the root server are also neighbors of each other, they will still appear only once, as first-level branches. Additionally, the server assigns its domain to one of the least assigned namespaces and updates the mapping table accordingly (i.e. by incrementing assignment count). This process is repeated with increasing levels of depth: filling in all grandchild nodes, then all great-grandchild nodes, and so on until the entire network has been mapped to all the namespace groups along the m-ary tree. The m-ary tree, once complete, contains a routing map from the root server to any machine in the network, and vice versa.

Figure 4:
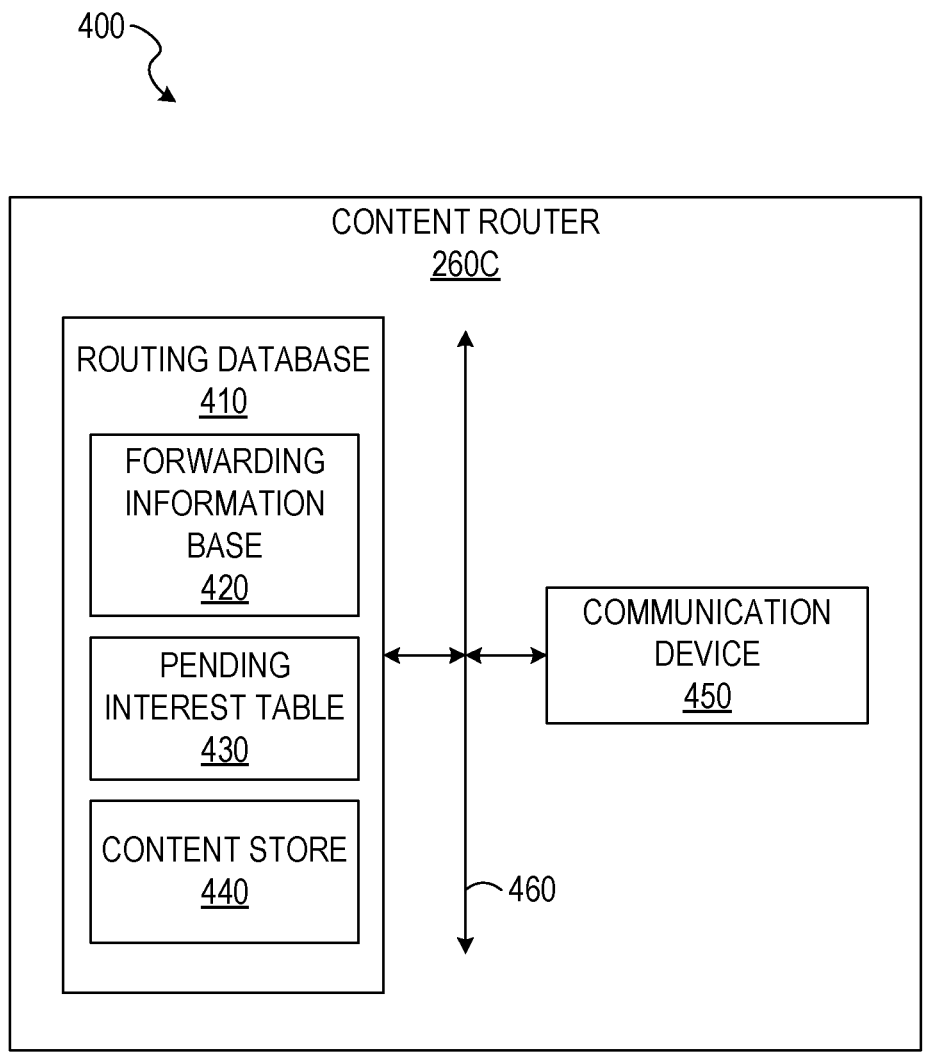
FIG. 4 is a block diagram illustrating devices of a computer system suitable for performing the functions of a content router in an information-centric network, according to some example embodiments.

FIG. 4 is a block diagram 400 illustrating devices of a computer system suitable for performing the functions of a content router (e.g., the content router 260C) in an information-centric network, according to some example embodiments. Devices may be hardware modules. A "hardware module" is a tangible unit capable of performing certain steps and may be configured or arranged in a certain physical manner In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain steps as described herein. As shown in FIG. 4, the content router 260C includes a routing database 410 that includes a FIB 420, a PIT 430, and a content store 440. The content router 260C further comprises a communication device 450, coupled to the routing database 410 by a bus or communication link 460. In some example embodiments, the devices of the content router 260C are combined into a single hardware module. In other example embodiments, features of the disclosed devices are divided into multiple hardware modules.

The routing database 410 accesses data stored on physical storage devices (e.g., hard disks, random access memory (RAM) chips, optical storage devices, or any suitable combination thereof) to satisfy queries. Data in the FIB 420, the PIT 430, and the content store 440 may be stored in the routing database 410 (e.g., in one or more tables of a relational database).

The routing of data requests and responses through the network 150 may be performed using the FIB 420. Content may be identified by names, which consist of components. For example, in the name "red/blue/green/a=5," the slashes serve to separate the components of "red," "blue," "green," and "a=5." Routing may be performed using a longest prefix match. Thus, if the content server has different routes for "red/blue," "red/blue/orange," and "red/blue/green," the route for "red/blue/green" will be selected for content identified as "red/blue/green/a=5" because the selected route matches the longest prefix of the name. In some example embodiments, each namespace anchor retains a routing table for its namespace, and other content routers only map the namespace to the namespace anchor. Thus, if the anchor server 280 were the namespace anchor for "red" and the request for content for "red/blue/green/a=5" was received from the consumer 130 at the content router 260C, the content router 260C would forward the request to the anchor server 280 based on the identification of the namespace "red."

Each content router may maintain a content store 440. The content store is a cache for content previously received by the content router. Future requests for the content can be served from the content store instead of being forwarded through the network.

A PIT 430 may be maintained on each content router. The PIT identifies a network path on which content should be sent when it is received by the content router. In the example above, the content router 260C would add an entry to its PIT showing that the content "red/blue/green/a=5" should be forwarded to the point of attachment 290. When the content is received at the content router 260C, the content is forwarded to the indicated destination and the PIT entry is deleted. A similar PIT at the point of attachment 290 allows the point of attachment 290 to forward the content to the consumer 130, at which point the data request is complete.

The communication device 450 is configured to communicate with external devices. The communication device 450 sends data to and receives data from other systems (e.g., the systems shown in FIG. 2). For example, the communication device 450 may receive data from the point of attachment 290, the content routers 260A, 260B, 260D, 220A-220D, and the anchor servers 230, 240, 270, 280; send data to the point of attachment 290, the content routers 260A, 260B, 260D, 220A-220D, and the anchor servers 230, 240, 270, 280; or any suitable combination thereof. The communication device 450 may be programmable to allow a variety of communication protocols to be implemented. For example, Java®, C, or C++ may be used to program the communication device 450. Example physical devices to implement the communication device 450 include a plug-in card, a universal serial bus (USB)-connected device, a modem, a network adapter, a configured central processing unit (CPU) or graphics processing unit (GPU), or any suitable combination thereof.

In some example embodiments, communications received by the communication device 450 cause the display of a user interface on the consumer 130. For example, the communication device 450 may transmit a web page for a web browser of the consumer 130. The web browser parses the web page to generate a user interface on the consumer 130, for display to a user.

Figure 5:
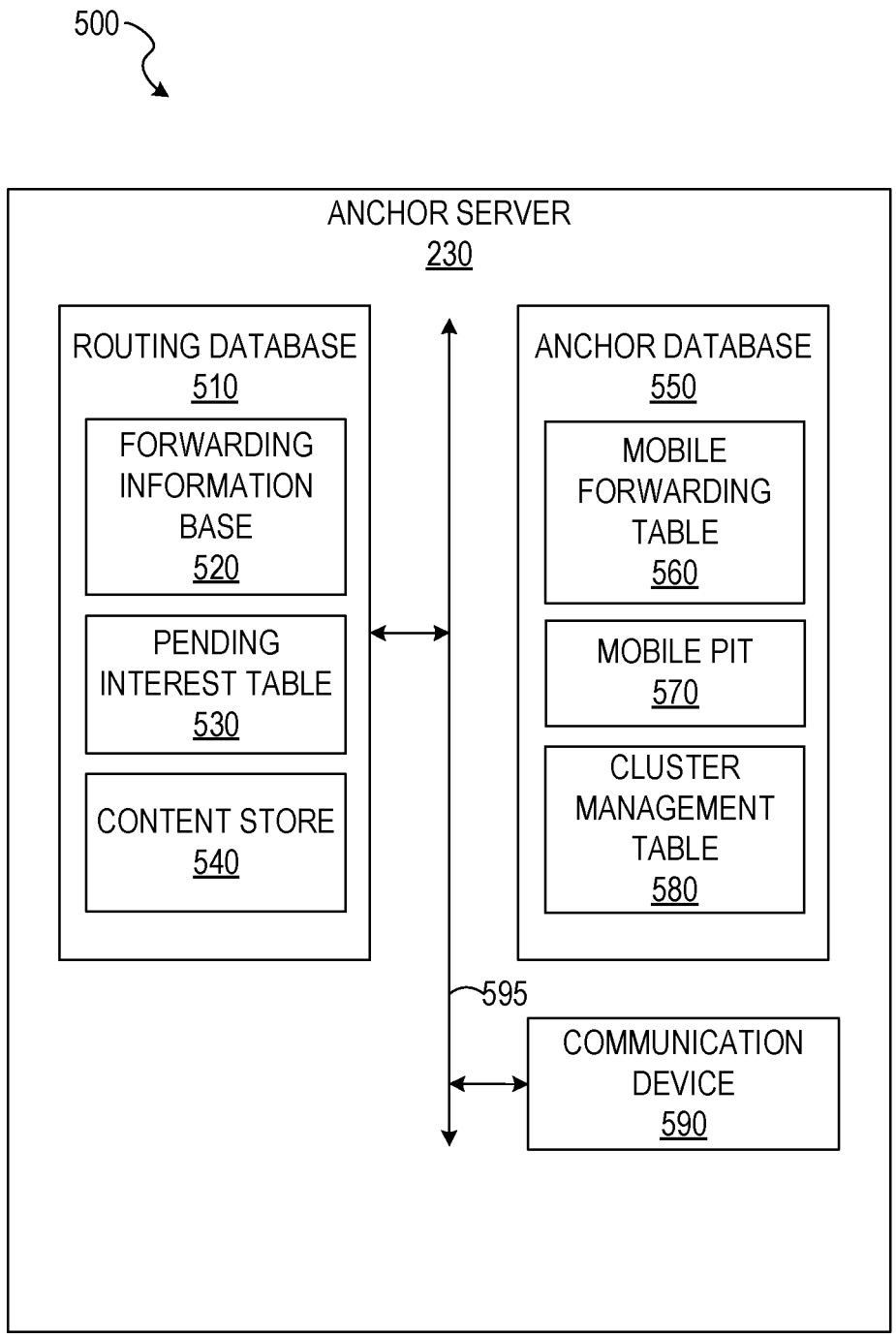
FIG. 5 is a block diagram illustrating devices of a computer system suitable for performing the functions of an anchor server in an information-centric network, according to some example embodiments.

FIG. 5 is a block diagram 500 illustrating devices of a computer system suitable for performing the functions of an anchor server 230 in an information-centric network, according to some example embodiments. As shown in FIG. 5, the anchor server 230 includes a routing database 510 that includes a FIB 520, a PIT 530, and a content store 540. The anchor server 230 further comprises an anchor database 550 that includes a mobile forwarding table 560, a mobile PIT 570, and a cluster management table 580 as well as a communication device 590. The routing database 510, anchor database 550, and communication device 590 are coupled by a bus or communication link 595. In some example embodiments, the devices of the anchor server 230 are combined into a single hardware module. In other example embodiments, features of the disclosed devices are divided into multiple hardware modules.

The routing database 510, FIB 520, PIT 530, and content store 540 may be implemented in the same or a similar manner as the routing database 410, FIB 420, PIT 430, and content store 440, as described with respect to the content router 260C.

The mobile forwarding table 560 stores entries identifying the domain of each producer involved in an active session with the anchor server. The anchor server may receive a path-insert message that indicates the path for a producer. Similarly, the anchor server may receive a path-remove message that indicates a particular path to be removed from the mobile forwarding table, the FIB, or both. After an elapse of a predetermined period of time, the path is removed from the mobile forwarding table in response to the receipt of the path-remove message. In some example embodiments, the predetermined period of time is dependent on a mobility metric provided by the producer within its data packets. For example, the average time for inter-domain handovers may be used.

The mobile PIT 570 operates as a temporary buffer to identify held requests and, potentially data packets (e.g., in a mobile content store with pointers to data instead of to interests), targeting mobile nodes while those nodes are in transition (of point of attachments). Data packets to be sent to mobile nodes when those nodes return to the network are stored in the content store. An entry in the mobile PIT 570 identifies the consumer to receive the data packet once a new path to the consumer is found. Similarly, the mobile PIT 570 holds data requests that cannot be immediately resolved because the producer that the request would be directed to if the producer were connected to the network is temporarily unavailable. In some example embodiments, the mobile PIT entries for a producer are allocated in fixed-size memory blocks. Once a block is full, an additional block is allocated, with the previous block storing a pointer to the additional block, creating chain of blocks per host. In this way, the size of the mobile PIT is able to change dynamically without requiring a new memory allocation for each entry.

The cluster management table 580 stores information regarding members of the cluster. For example, a mapping between producers and their corresponding LNAs may be stored, a path to the GNA for each namespace of the anchor server 230 may be stored, or any suitable combination thereof.

Figure 6:
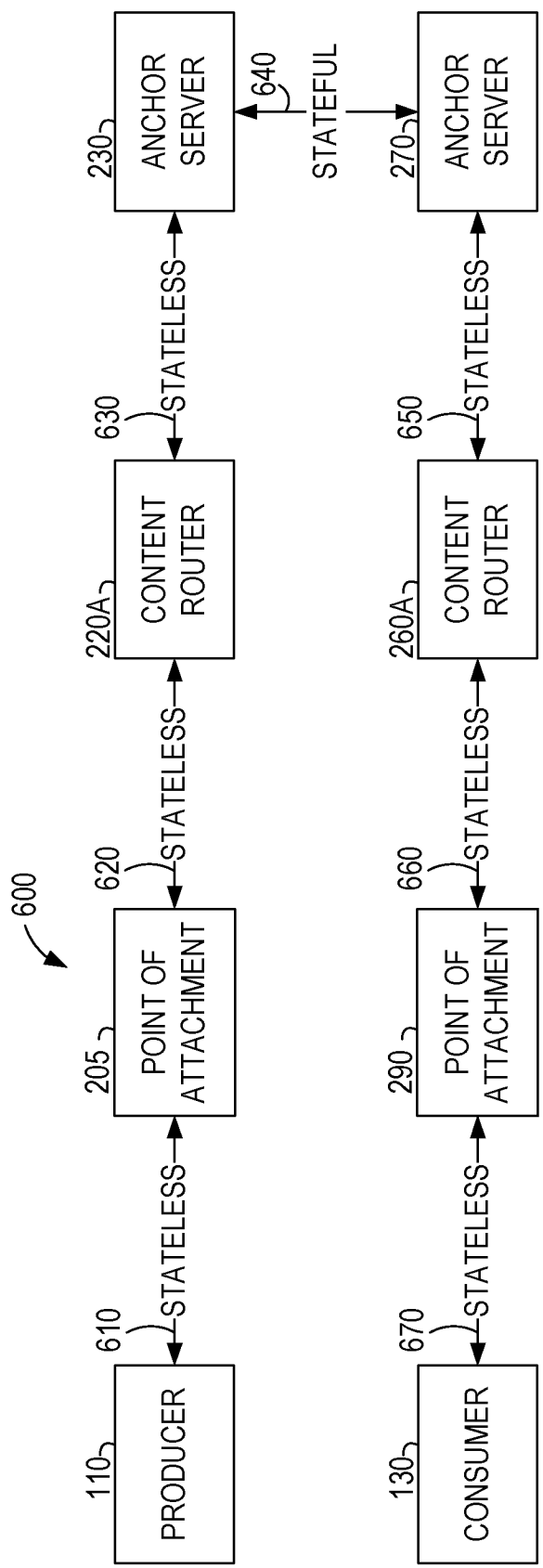
FIG. 6 is a communication diagram illustrating communication modes between a producer, a consumer, and intermediate servers in an information-centric network, according to some example embodiments.

FIG. 6 is a communication diagram 600 illustrating communication modes between a producer, a consumer, and intermediate servers in an information-centric network, according to some example embodiments. In the example communication diagram 600, the communication is from the producer 110 to the consumer 130 via their respective points of attachments 205 and 290; content routers 220A and 260A of their respective domains; and anchor servers 230 and 270. Communications 610, 620, 630, 650, 660, and 670 are stateless. In a stateless communication protocol, each request is treated as independent from each other request, as no request related information is stored within the stateless portion on the connection. By contrast, in a stateful communication protocol, parties to the communication store information from one communication to the next. As shown in the communication diagram 600, the only stateful communication is communication 640, between the two anchor servers 230 and 270.

In this context, the stateful/stateless distinction refers to the ability to determine the routing of data requests and responses. Within a domain, each content router forwards each packet from a producer associated with a namespace to the anchor server for the namespace on the domain Similarly, within a domain, each content router knows the address of each device on the domain, and thus is able to route packets intended for a particular consumer or producer on the domain to the device. When communicating between domains, only the anchor servers must be prepared to search for routing paths to particular devices, and to maintain state for those devices once the paths are identified. Thus, in this model, only the communications between anchor servers are considered stateful, with forwarding states limited to anchor servers In some example embodiments, the consumer 130 is able to verify that the data received in response to a data request is correct because the data packets are signed by the producer. Similarly, the producer 110 is able to verify that the data is being requested by an authorized consumer when the request is signed by the consumer 130. Additionally or alternatively, the data transmitted may be encrypted, and thus not accessible by the intermediate servers handling the data between the producer 110 and the consumer 130.

Figure 7:
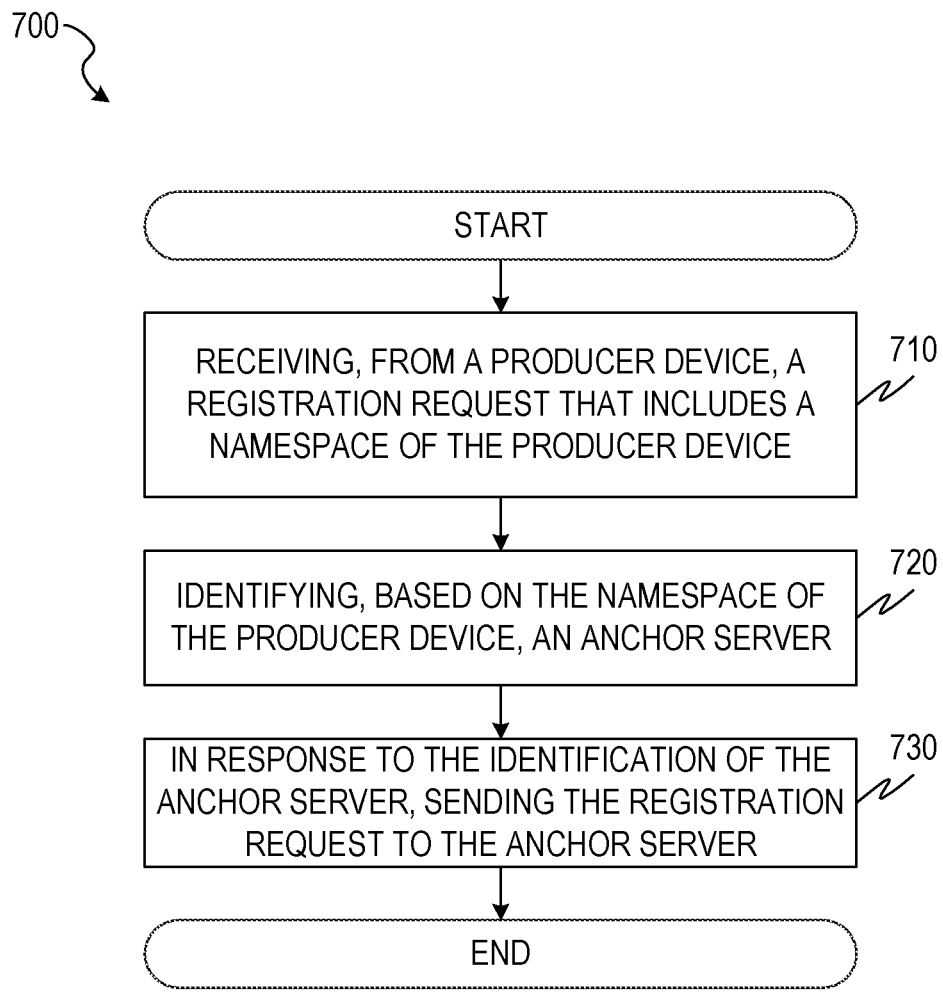
FIG. 7 is a flow diagram illustrating steps performed by a computer system suitable for a mobility support architecture in an information-centric network, according to some example embodiments.

FIG. 7 is a flow diagram 700 illustrating steps performed by a computer system suitable for a mobility support architecture in an information-centric network, according to some example embodiments. By way of example and not limitation, the steps of the flow diagram 700 are described as being performed by the devices of FIG. 4.

In step 710, a content router in a domain of a producer receives, via the communication device 450, a registration request that includes a namespace of the producer. The registration request explicitly or implicitly identifies a routing path to the producer. For example, the registration request may include an identifier of a point of attachment by which the producer connects to the ICN. As another example, one or more data packets containing the registration request may contain routing information that identifies one or more intermediate hosts along the path between the producer and the content router.

Step 710 may be performed repeatedly for different namespaces, different producers, or both. For example, a single producer may register as a provider of content for two or more namespaces. As another example, two or more producers may register as providers of content for the same or different namespaces. The content router, in step 720, identifies an anchor server based on the namespace of the registration request using the FIB 420 of the routing database 410. In some example embodiments, the name of the namespace is hashed to generate an identifier which is used as a key to query a database for the identifier of the anchor server. Hashing may provide a speed advantage over a direct string comparison of the name of the namespace to identify the anchor server.

For example, let the number of namespaces be K. The identifiers of the namespaces are chosen such that each of the K namespaces provides a different value after hashing the identifier and taking modulo K. The result is used to identify the content router in the domain acting as a local name anchor for the namespace. This may be accomplished by assigning each content router an identifier such that, when hashed, the hash-output for each content router is unique. The identifiers are assigned such that the lowest K identifiers are assigned as local name anchors to the K namespaces (e.g., the lowest identifier is assigned to the namespace with a modulus hash value of 0, the next-lowest identifier is assigned to the namespace with a modulus hash value of 1, and so on). In some example embodiments, name anchors are assigned virtual identifiers. The virtual identifiers allow one physical name anchor to provide local name anchor services for multiple namespaces. Virtual identifiers also allow dynamic reassignment of namespaces between name anchors. Additionally, multiple name anchors may be assigned the same virtual identifier. In these implementations, communications to the name anchor may be sent using anycast, routing the request to the topologically nearest name anchor having the virtual identifier.

In response to the identification of the anchor server, the content router sends, via the communication device 450, the registration request to the anchor server (step 730). Accordingly, in embodiments in which each anchor server services a single namespace (or namespace group, in which the entries are mapped to the same identifier), registration requests associated with different namespaces (or namespace groups) will be routed to different anchor servers.

In some example embodiments, the producer provides a host identifier with the registration request. In these embodiments, the host identifier may be used as the namespace. Accordingly, all registrations by a particular producer having the same host identifier are sent to the same LNA, regardless of the application for the content or other factors. This may simplify the process of deregistration and reregistration if the producer moves to a different location on the network.

The flow diagram 700 is performed, with slight modifications, by the local name anchor of the domain as well. The differences are that, in step 710, the local name anchor receives the registration request from the content router; in step 720, the local name anchor identifies a global name anchor based on the namespace of the producer device; and in step 730, the local name anchor sends the registration request to the global name anchor.

Figure 8:
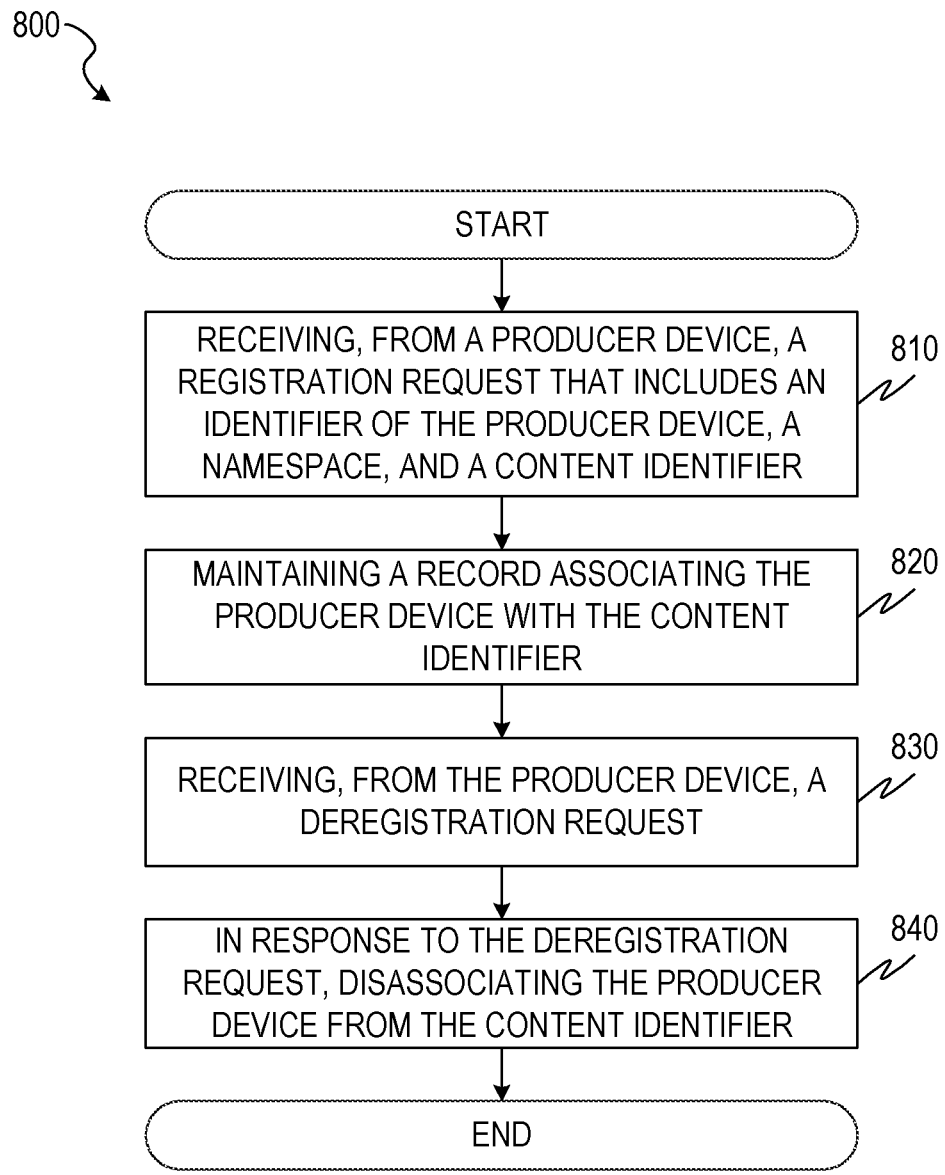
FIG. 8 is a flow diagram illustrating steps performed by a computer system suitable for a mobility support architecture in an information-centric network, according to some example embodiments.

FIG. 8 is a flow diagram of a process 800 illustrating steps performed by a computer system suitable for a mobility support architecture in an information-centric network, according to some example embodiments. By way of example and not limitation, the steps of the process 800 are described as being performed by the devices of FIG. 5.

In step 810, the anchor server receives, via the communication device 590 and from a producer device, a registration request that includes an identifier of the producer device, a namespace, and a content identifier. In some example embodiments, the registration request is generated by the producer device so that consumers of the registered content will be able to find the content on the producer device. As discussed with respect to step 710, above, the registration request may also identify a point of attachment by which the producer is connected to the ICN.

In step 820, the anchor server maintains a record associating the producer device with the content identifier. For example, the record may be stored in the mobile forwarding table 560 of the anchor database 550. Accordingly, future or pending requests for the content may be forwarded by the anchor server to the producer based on the record. The mobile forwarding table 560 may contain multiple records for each producer, associating any number of pieces of content with each producer.

The anchor server, in step 830, receives, from the producer device, a deregistration request. In some example embodiments, the deregistration request is sent by the producer device when the producer is planning to leave the network, when the producer is changing attachment points, when the producer is no longer making the registered content available, or any suitable combination thereof. Note that the deregistration request may be sent by the point of attachment of the producer device instead of by the producer device itself. For example, the point of attachment may track which devices are connected and, when a device disconnects, automatically generate a deregistration request for the device. As another example, the point of attachment may track which devices are connected and periodically inform the namespace anchors on the domain or all content routers on the domain of which devices are connected. Accordingly, the namespace anchor may recognize when a device has become disconnected and treat that as a deregistration request.

In step 840, the anchor server, in response to the deregistration request, disassociates the producer device from the content identifier. For example, the record stored in step 820 may be deleted or marked as deactivated.

In some example embodiments, the process 800 is performed by both global and local name anchors. For example, as discussed with respect to FIG. 7, a local name anchor may be configured to forward registration and deregistration requests to the global name anchor for the namespace of the requests. Accordingly, the global name anchor may perform each of the steps 810-840 to maintain global records of the registration of producers for content of the namespace for the global name anchor. In some example embodiments, the global name anchor broadcasts changes to all local name anchors. Alternatively, local name anchors may query the global name anchor periodically, when a communication error occurs, or any suitable combination thereof.

Figure 9:
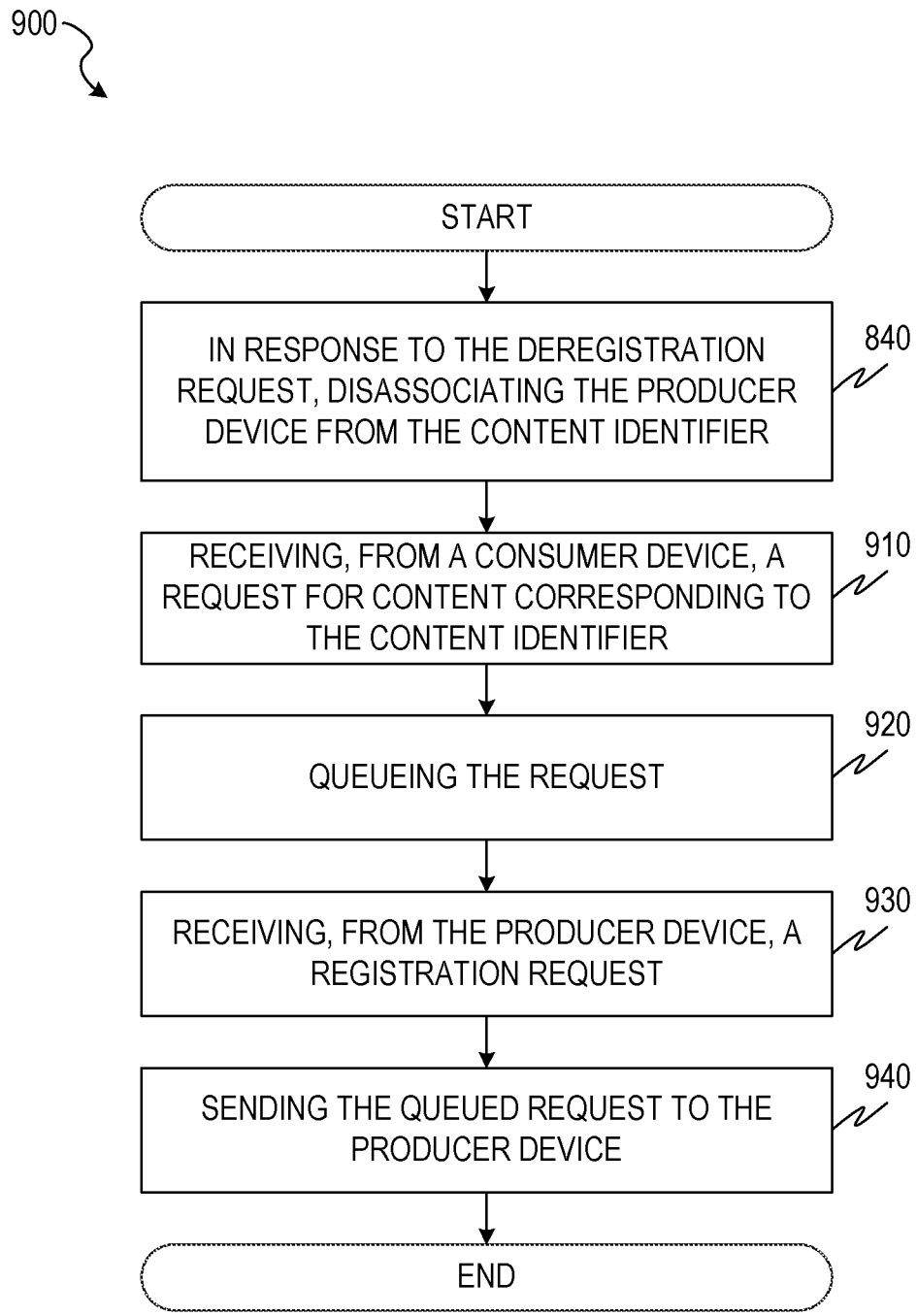
FIG. 9 is a flow diagram illustrating steps performed by a computer system suitable for a mobility support architecture in an information-centric network, according to some example embodiments.

FIG. 9 is a flow diagram of a process 900 illustrating steps performed by a computer system suitable for a mobility support architecture in an information-centric network, according to some example embodiments. By way of example and not limitation, the steps of the process 900 are described as being performed by the devices of FIG. 5.

In step 840, as described above, the anchor server, in response to the deregistration request, disassociates the producer device from the content identifier. For example, the record stored in step 820 may be deleted or marked as deactivated.

In step 910, the anchor server receives, from a consumer device, a request for content corresponding to the content identifier. For example, a consumer device on a first domain may request content previously registered as being provided by a producer device on a second domain. The request from the consumer device propagates from the anchor server of the first domain to the anchor server of the second domain. However, in this example, the producer deregistered the content before the anchor server of the second domain sent the request to the producer. Accordingly, in step 920, the anchor server queues the request (e.g., in the mobile PIT 570 of the anchor database 550). Steps 910 and 920 may be repeated for multiple requests for content from multiple consumer devices.

In step 930, the anchor server receives, from the producer device, a registration request. In some example embodiments, the registration request includes the content identifier, allowing association between the producer and the content as in step 810. In other example embodiments, the registration request does not include the content identifier. Accordingly, the association between the producer and the content is reestablished in another way. For example, if the record associating the producer with the content was marked deactivated in step 840, the deactivated records for the producer may be reactivated in response to the receipt of the registration request.

In some example embodiments, the registration request identifies a point of attachment for the producer device. The point of attachment in step 930 may be different from the point of attachment in step 810, but still in the same domain In response to receiving the registration request, the anchor server sends the data request queued in step 920 to the producer device via its current point of attachment. Accordingly, a temporary disruption in the availability of the producer device does not impact the routing of requests across the network.

Figure 10:
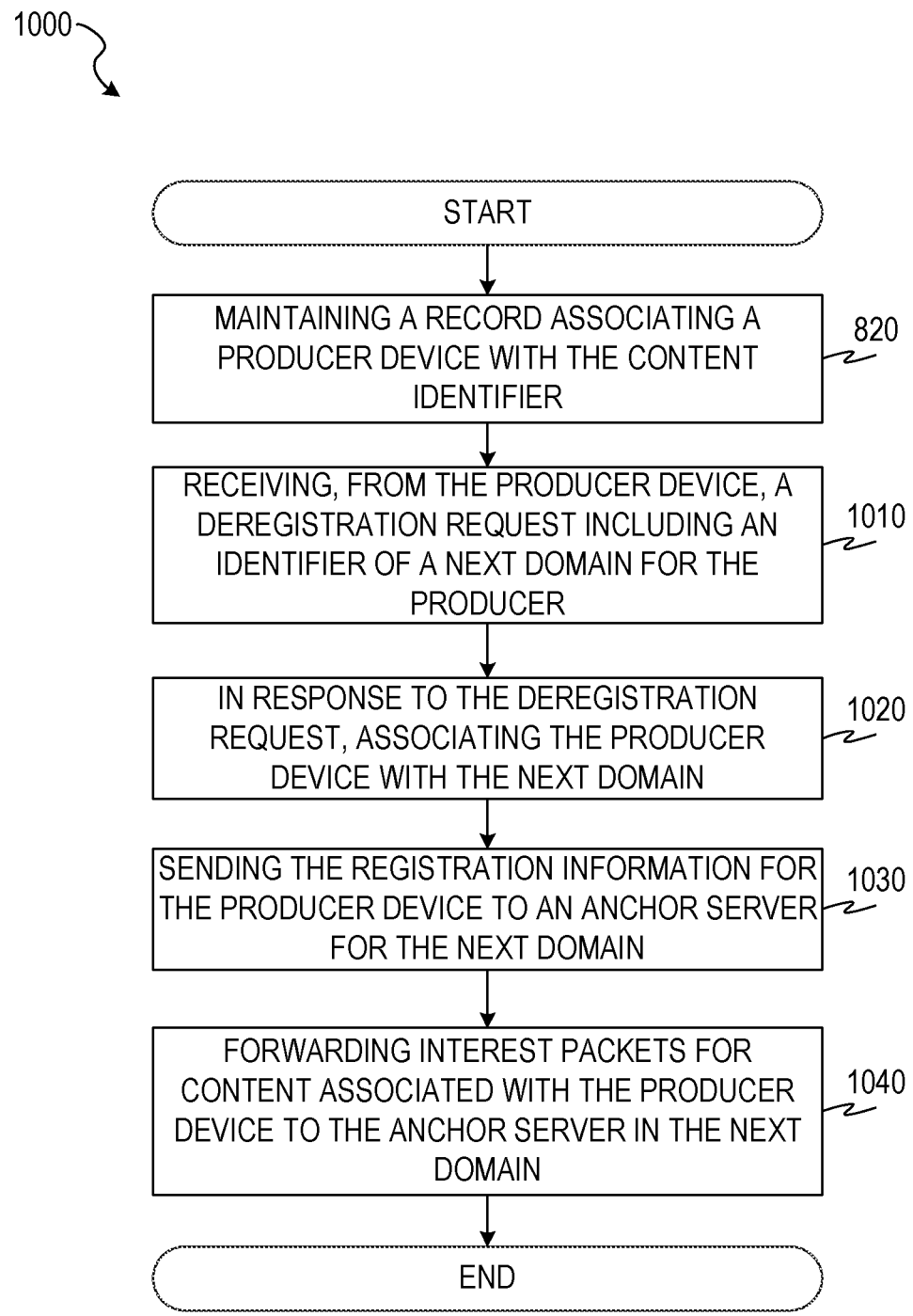
FIG. 10 is a flow diagram illustrating steps performed by a computer system suitable for a mobility support architecture in an information-centric network, according to some example embodiments.

FIG. 10 is a flow diagram of a process 1000 illustrating steps performed by a computer system suitable for a mobility support architecture in an information-centric network, according to some example embodiments. By way of example and not limitation, the steps of the process 1000 are described as being performed by the devices of FIG. 5.

In step 820, as described above, the anchor server maintains a record associating a producer device with the content identifier. The anchor server receives, from the producer device, a deregistration request that includes an identifier of a next domain for the producer (step 1010). For example, the producer may be a mobile device that is leaving the range of a first cell tower and entering the range of a second cell tower. As the producer moves, the signal strength of one tower diminishes while the signal strength of the other increases. When the two towers are in the same domain, the method of FIG. 9 may be used to update the point of attachment of the producer. When the two towers are in different domains, the producer has advance notice of the domain it is moving to. Accordingly, the producer is able to include an identifier of the next domain in the deregistration request sent to the anchor server of its current domain In step 1020, the anchor server updates its records for the producer to indicate that the producer is now associated with the next domain. For example, the content registration records may be maintained but modified to show that requesters or the previous anchors should be notified of the new domain for the producer, that requests for content provided by the producer should be forwarded to the next domain, or both. The anchor server, in step 1030, forwards the registration information for the producer to the next domain Additionally or alternatively, the anchor server, in step 1040, forwards interest packets for content associated with the producer device to the anchor server in the next domain. In some example embodiments, the registration records for the producer are deleted from the anchor server after a predetermined period of time elapses after receipt of the deregistration request.

In some example embodiments, content in response to the forwarded interest packets is sent from the next domain back to the consumer via the anchor server. The packets, as they are routed back to the consumer, contain an indication of the source (or producer's) domain. Accordingly, the consumer and the intermediate content routers may attempt to find a better route to the producer's domain. For example, the intermediate content routers may drive some packets directly to the producer's domain and continue to forward some packets along the pre-established route. The time to respond to packets sent along the different routes can be compared, and the faster route selected for future use. As another example, ping-interest packets may be sent. A ping-interest packet is not a genuine request for content, but provokes a ping-response that allows the round-trip travel time for the ping to be determined. The ping time may be used to determine which route of several options is the most efficient. In some example embodiments, cost factors other than time are considered. For example, a GNA may have a lower latency response to the reassignment of a producer to a new domain, and thus may be selected as a higher-priority intermediate node. Implementation of the higher priority may be performed by reducing the effective ping time of the GNA. For example, a fixed amount of time may be subtracted from the observed ping time of routes that traverse the GNA. Alternatively or additionally, the observed ping time of routes that traverse the GNA by be reduced by a set percentage.

Figure 11:
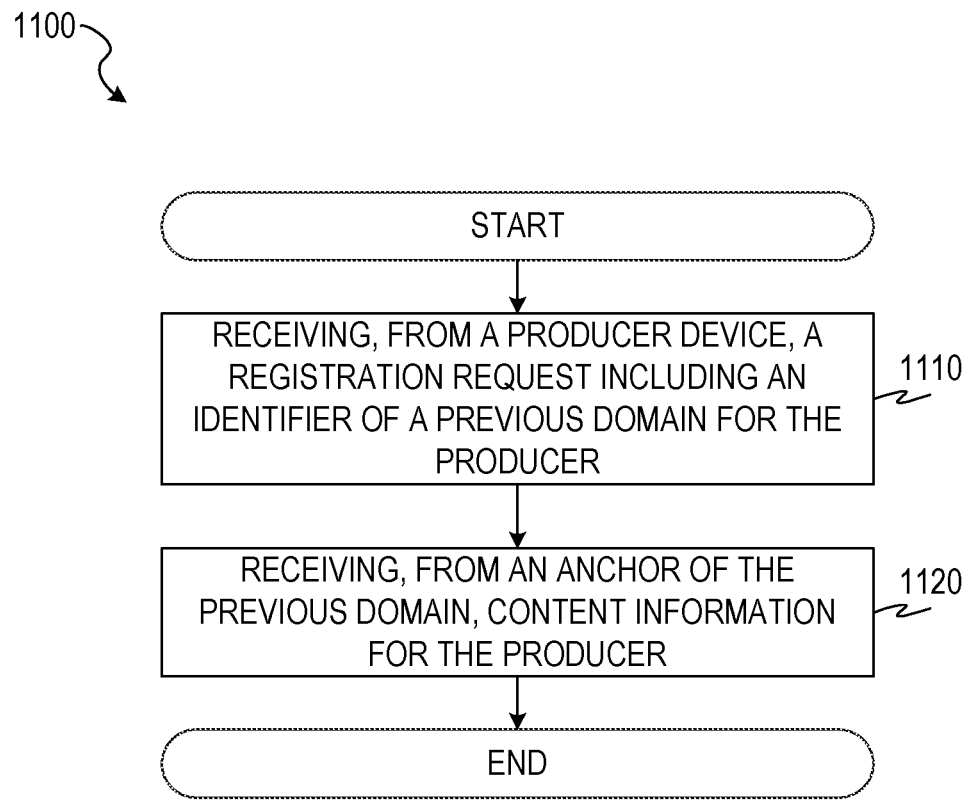
FIG. 11 is a flow diagram illustrating steps performed by a computer system suitable for a mobility support architecture in an information-centric network, according to some example embodiments.
Figure 12:
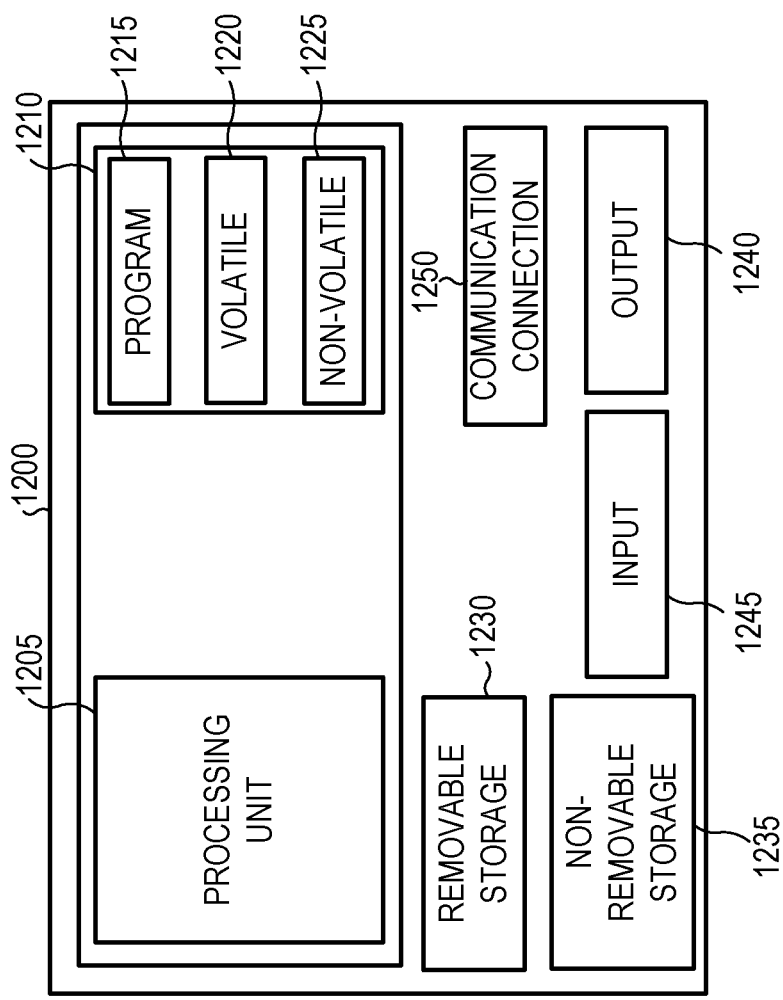
FIG. 12 is a block diagram illustrating circuitry for clients, servers, and cloud based resources for implementing algorithms and performing methods according to example embodiments.

FIG. 11 is a flow diagram of a process 1100 illustrating steps performed by a computer system suitable for a mobility support architecture in an information-centric network, according to some example embodiments. By way of example and not limitation, the steps of the process 1100 are described as being performed by the devices of FIG. 5. The process 1100 may be performed by the anchor server in the domain a producer device moves to as a result of inter-domain mobility.

In step 1110, the anchor server receives, from the producer device, a registration request that includes an identifier of a previous domain for the producer (e.g., the domain in which the process 1000 was performed). In step 1120, the anchor server of the new domain receives, from an anchor server of the previous domain, content information for the producer. In some example embodiments, the content information for the producer is received automatically by the new domain of the producer. For example, step 1030 may have been performed by the previous name anchor in response to the producer's deregistration request. In other example embodiments, the name anchor of the producer's current domain requests the content information from the previous name anchor in response to the producer's registration request, after successful registration.

When step 1120 occurs without an explicit request by the producer's new anchor server, the step may occur before the step 1110. In that case, the association between the content and the unregistered producer may be stored by the anchor server for a predetermined period of time. If the registration request is received within the period of time, an active connection is established and the records will not time out. If no registration request is received within the period of time, the records may be deleted when the time expires. Accordingly, if a registration request is received after the elapse of the period of time, the producer will need to identify the content it provides.

Modules, Components, and Logic

The various steps of example methods described herein may be performed, at least partially, by one or more processors that are temporarily configured (e.g., by software) or permanently configured to perform the relevant steps. Whether temporarily or permanently configured, such processors may constitute processor-implemented modules that operate to perform one or more steps or functions described herein. As used herein, "processor-implemented module" refers to a hardware module implemented using one or more processors.

Similarly, the methods described herein may be at least partially processor-implemented, with a particular processor or processors being an example of hardware. For example, at least some of the steps of a method may be performed by one or more processors or processor-implemented modules. Moreover, the one or more processors may also operate to support performance of the relevant steps in a "cloud computing" environment or as a "software as a service" (SaaS). For example, at least some of the steps may be performed by a group of computers (as examples of machines including processors), with these steps being accessible via a network (e.g., the Internet) and via one or more appropriate interfaces (e.g., an Application Program Interface (API)).

The performance of certain of the steps may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations. Implementation of one or more of the methodologies described herein may improve the responsiveness of an ICN to producer mobility.

Machine and Software Architecture

The modules, methods, applications, and so forth described in conjunction with FIGS. 1-11 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the invention in different contexts from the disclosure contained herein.

One example computing device in the form of a computer 1200 may include a processing unit 1205, memory 1210, removable storage 1230, and non-removable storage 1235. Although the example computing device is illustrated and described as computer 1200, the computing device may be in different forms in different embodiments. Further, although the various data storage elements are illustrated as part of the computer 1200, the storage may also or alternatively include cloud-based storage accessible via a network, such as the Internet or server based storage.

Memory 1210 may include volatile memory 1220 and non-volatile memory 1225. Computer 1200 may include—or have access to a computing environment that includes—a variety of computer-readable media, such as volatile memory 1220 and non-volatile memory 1225, removable storage 1230 and non-removable storage 1235. Computer storage includes RAM, read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1200 may include or have access to a computing environment that includes output 1240, input 1245, and a communication connection 1250. Output 1240 may include a display device, such as a touchscreen, that also may serve as an input device. The input 1245 may include one or more of a touchscreen, touchpad, mouse, keyboard, camera, one or more device-specific buttons, one or more sensors integrated within or coupled via wired or wireless data connections to the computer 1200, and other input devices. The computer may operate in a networked environment using a communication connection to connect to one or more remote computers, such as database servers. The remote computer may include a personal computer (PC), server, router, network PC, a peer device or other common network node, or the like. The communication connection may include a LAN, a WAN, cellular, WiFi, Bluetooth, or other networks.

Computer-readable instructions stored on a computer-readable medium are executable by the processing unit 1205 of the computer 1200. A hard drive, CD-ROM, and RAM are some examples of articles including a non-transitory computer-readable medium such as a storage device. The terms computer-readable medium and storage device do not include carrier waves to the extent carrier waves are deemed to be transitory. For example, a computer program 1215 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 1200 to provide generic access controls in a COM based computer network system having multiple users and servers. Storage can also include networked storage such as a storage area network (SAN).

What is claimed is:

1. A system comprising:
a memory storing instructions; and
one or more processors configured by the instructions to perform operations comprising:
  maintaining a set of records associating content identifiers with a producer device in an information centric network (ICN);
  receiving from a consumer device in the ICN, a first set of data requests, each data request in the first set of data requests including a content identifier associated with the producer device;
  in response to a determination, based on the set of records, that the producer device has been deregistered, queueing the first set of data requests;
  in response to receipt of a first registration request from the producer device:
    updating the set of records to indicate registration of the producer device, and
    sending the queued first set of data requests to the producer device;
  receiving, from the producer device, a second registration request that includes a namespace of the producer device and identifies a point of attachment that connects the producer device to the ICN;
  in response to the second registration request, identifying, based on the namespace of the producer device, a first server in the ICN, by performing operations comprising:
    determining a hash of the namespace of the producer device; and
    querying a database for an identifier of the first server using the determined hash; and
  in response to the identification of the first server, sending the second registration request to the first server.

2. The system of claim 1, wherein the operations further comprise:
receiving, from a second producer device in the ICN, a third registration request that includes a namespace of the second producer device, the namespace of the second producer device being different from the namespace of the producer device;
identifying, based on the namespace of the second producer device, a second server in the ICN different from the first server in the ICN; and
in response to the identification of the second server, sending the third registration request to the second server.

3. The system of claim 1, wherein:
the second registration request includes a content identifier; and
the operations further comprise:
  receiving, via the ICN, a data request from a consumer device, the data request including:
    a namespace,
    an identifier of a third server in the ICN associated with the consumer device, and
    the content identifier; and
  based on the namespace of the data request matching the namespace of the second registration request, maintaining a record associating the content identifier with the identifier of the third server.

4. The system of claim 3, wherein the operations further comprise:
receiving, from the producer device and via the ICN, content having the content identifier;
identifying, based on the content identifier and the record, the third server; and
in response to the identification of the third server, sending the received content to the third server.

5. The system of claim 1, wherein the operations further comprise:
receiving, from the consumer device in the ICN, a second set of data requests, each data request in the second set of data requests including a content identifier associated with the producer device by the set of records; and
sending the second set of data requests to the producer device.

6. A method comprising:
maintaining, at a content router in an information centric network (ICN), a set of records associating content identifiers with a producer device in the ICN;
receiving, from a consumer device in the ICN, a first set of data requests, each data request in the first set of data requests including a content identifier associated with the producer device;
in response to a determination, based on the set of records, that the producer device has been deregistered, queueing the first set of data requests;

in response to receipt of a first registration request from the producer device:
  updating the set of records to indicate registration of the producer device, and
  sending the queued first set of data requests to the producer device;
receiving, from the producer device, a second registration request that includes a namespace of the producer device and identifies a point of attachment that connects the producer device to the ICN;
in response to the second registration request, identifying, based on the namespace of the producer device, a first server in the ICN by performing operations comprising:
  determining a hash of the namespace of the producer device; and
  querying a database for an identifier of the first server using the determined hash; and
in response to the identification of the first server, sending the second registration request to the first server.

7. The method of claim 6, further comprising:
receiving, from a second producer device in the ICN, a third registration request that includes a namespace of the second producer device, the namespace of the second producer device being different from the namespace of the producer device;
identifying, based on the namespace of the second producer device, a second server in the ICN different from the first server in the ICN; and
in response to the identification of the second server, sending the third registration request to the second server.

8. The method of claim 6, wherein:
the second registration request includes a content identifier; and
the method further comprises:
  receiving, via the ICN, a data request from a consumer device, the data request including:
    a namespace,
    an identifier of a third server in the ICN associated with the consumer device, and
    the content identifier; and
  based on the namespace of the data request matching the namespace of the second registration request, maintaining a record associating the content identifier with the identifier of the third server.

9. The method of claim 8, further comprising:
receiving, from the producer device and via the ICN, content having the content identifier;
identifying, based on the content identifier and the record, the third server; and
in response to the identification of the third server, sending the received content to the third server.

10. The method of claim 6, further comprising:
receiving, from the consumer device in the ICN, a second set of data requests, each data request in the second set of data requests including a content identifier associated with the producer device by the set of records; and
sending the second set of data requests to the producer device.

11. A non-transitory machine-readable medium having instructions embodied thereon which, when executed by one or more processors of a machine, cause the machine to perform operations comprising:
maintaining a set of records associating content identifiers with a producer device in an information centric network (ICN);
receiving from a consumer device in the ICN, a first set of data requests, each data request in the first set of data requests including a content identifier associated with the producer device;
in response to a determination, based on the set of records, that the producer device has been deregistered, queueing the first set of data requests;
in response to receipt of a first registration request from the producer device:
  updating the set of records to indicate registration of the producer device, and
  sending the queued first set of data requests to the producer device;
receiving, from the producer device, a second registration request that includes a namespace of the producer device and identifies a point of attachment that connects the producer device to the ICN;
in response to the second registration request, identifying, based on the namespace of the producer device, a first server in the ICN by performing operations comprising:
  determining a hash of the namespace of the producer device; and
  querying a database for an identifier of the first server using the determined hash; and
in response to the identification of the first server, sending the second registration request to the first server.

12. The non-transitory machine-readable medium of claim 11, wherein the operations further comprise:
receiving, from a second producer device in the ICN, a third registration request that includes a namespace of the second producer device, the namespace of the second producer device being different from the namespace of the producer device;
identifying, based on the namespace of the second producer device, a second server in the ICN different from the first server in the ICN; and
in response to the identification of the second server, sending the third registration request to the second server.

13. The non-transitory machine-readable medium of claim 11, wherein:
the second registration request includes a content identifier; and
the operations further comprise:
  receiving, via the ICN, a data request from a consumer device, the data request including:
    a namespace,
    an identifier of a third server in the ICN associated with the consumer device, and
    the content identifier; and
  based on the namespace of the data request matching the namespace of the second registration request, maintaining a record associating the content identifier with the identifier of the third server.

14. The non-transitory machine-readable medium of claim 13, wherein the operations further comprise:
receiving, from the producer device and via the ICN, content having the content identifier;
identifying, based on the content identifier and the record, the third server; and
in response to the identification of the third server, sending the received content to the third server.

* * * * *